United States Patent
Chen

(10) Patent No.: US 11,962,491 B2
(45) Date of Patent: Apr. 16, 2024

(54) SOURCE ROUTING TUNNEL INGRESS PROTECTION

(71) Applicant: HUAWEI TECHNOLOGIES CO., LTD., Shenzhen (CN)

(72) Inventor: Huaimo Chen, Bolton, MA (US)

(73) Assignee: Huawei Technologies Co., Ltd., Shenzhen (CN)

( * ) Notice: Subject to any disclaimer, the term of this patent is extended or adjusted under 35 U.S.C. 154(b) by 276 days.

(21) Appl. No.: 17/177,776

(22) Filed: Feb. 17, 2021

(65) Prior Publication Data
US 2021/0176169 A1 Jun. 10, 2021

Related U.S. Application Data

(63) Continuation of application No. PCT/US2019/046387, filed on Aug. 13, 2019.

(60) Provisional application No. 62/719,486, filed on Aug. 17, 2018.

(51) Int. Cl.
H04L 45/00 (2022.01)

(52) U.S. Cl.
CPC .............. H04L 45/34 (2013.01); H04L 45/22 (2013.01)

(58) Field of Classification Search
None
See application file for complete search history.

(56) References Cited

U.S. PATENT DOCUMENTS

| | | | | |
|---|---|---|---|---|
| 6,229,787 | B1 * | 5/2001 | Byrne | H04Q 11/0478 370/219 |
| 8,908,501 | B2 * | 12/2014 | Chen | H04L 45/22 370/395.31 |
| 9,923,798 | B1 * | 3/2018 | Bahadur | H04L 45/00 |
| 2003/0142669 | A1 * | 7/2003 | Kubota | H04L 45/50 370/469 |
| 2007/0263535 | A1 * | 11/2007 | Shabtay | H04L 12/66 370/252 |
| 2008/0123651 | A1 | 5/2008 | Vasseur et al. | |
| 2012/0092986 | A1 | 4/2012 | Chen | |
| 2014/0369185 | A1 * | 12/2014 | Chen | H04L 45/50 370/221 |

(Continued)

FOREIGN PATENT DOCUMENTS

| | | |
|---|---|---|
| CN | 105191230 A | 12/2015 |
| CN | 105282028 A | 1/2016 |

(Continued)

OTHER PUBLICATIONS

Crabbe, E., et al., "Path Computation Element Communication Protocol (PCEP) Extensions for Stateful PCE," RFC 8231, Sep. 2017, 57 pages.

*Primary Examiner* — Xavier S Wong
(74) *Attorney, Agent, or Firm* — Conley Rose, P.C.

(57) ABSTRACT

A network node including a processor coupled to a memory. The processor is configured to receive instructions from the memory which, when executed by the processor, cause the network node to receive a path computation request, calculate a first path from a first ingress node to an egress node, calculate a second path from a second ingress node to a destination node, transmit a first message comprising the first path to the first ingress node, and transmit a second message comprising the second path to the second ingress node.

20 Claims, 12 Drawing Sheets

(56) References Cited

U.S. PATENT DOCUMENTS

| | | | |
|---|---|---|---|
| 2015/0103844 A1* | 4/2015 | Zhao | H04L 45/507 370/410 |
| 2016/0173366 A1 | 6/2016 | Saad et al. | |
| 2016/0234105 A1 | 8/2016 | Li et al. | |
| 2017/0064717 A1 | 3/2017 | Filsfils et al. | |
| 2017/0373966 A1 | 12/2017 | Liao et al. | |
| 2019/0020738 A1* | 1/2019 | Paul | H04L 45/58 |

FOREIGN PATENT DOCUMENTS

| | | |
|---|---|---|
| CN | 105594167 A | 5/2016 |
| CN | 105704019 A | 6/2016 |
| CN | 105871721 A | 8/2016 |

* cited by examiner

```
                          800
                            ↘

0                   1                   2                   3
      0 1 2 3 4 5 6 7 8 9 0 1 2 3 4 5 6 7 8 9 0 1 2 3 4 5 6 7 8 9 0 1
      +-+-+-+-+-+-+-+-+-+-+-+-+-+-+-+-+-+-+-+-+-+-+-+-+-+-+-+-+-+-+-+-+
      |           Type = TBD          |          Length = 4           |
      +-+-+-+-+-+-+-+-+-+-+-+-+-+-+-+-+-+-+-+-+-+-+-+-+-+-+-+-+-+-+-+-+
      |                     Interface Index (4 bytes)                 |
      +-+-+-+-+-+-+-+-+-+-+-+-+-+-+-+-+-+-+-+-+-+-+-+-+-+-+-+-+-+-+-+-+
                            Interface Index sub-TLV
```

0                   1                   2                   3
      0 1 2 3 4 5 6 7 8 9 0 1 2 3 4 5 6 7 8 9 0 1 2 3 4 5 6 7 8 9 0 1
      +-+-+-+-+-+-+-+-+-+-+-+-+-+-+-+-+-+-+-+-+-+-+-+-+-+-+-+-+-+-+-+-+
      |           Type = TBD          |          Length = 4           |
      +-+-+-+-+-+-+-+-+-+-+-+-+-+-+-+-+-+-+-+-+-+-+-+-+-+-+-+-+-+-+-+-+
      |                   Interface IPv4 Address (4 bytes)            |
      +-+-+-+-+-+-+-+-+-+-+-+-+-+-+-+-+-+-+-+-+-+-+-+-+-+-+-+-+-+-+-+-+
                         Interface IPv4 Address sub-TLV
```

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|        Type = TBD             |          Length = 4           |
+-+-+-+-+-+-+-+-+-+-+-+-+-+-+-+-+-+-+-+-+-+-+-+-+-+-+-+-+-+-+-+-+
|       zero        |          Service Label (20 bits)          |
+-+-+-+-+-+-+-+-+-+-+-+-+-+-+-+-+-+-+-+-+-+-+-+-+-+-+-+-+-+-+-+-+
                        Service Label sub-TLV
```

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|        Type = TBD             |          Length = 4           |
+-+-+-+-+-+-+-+-+-+-+-+-+-+-+-+-+-+-+-+-+-+-+-+-+-+-+-+-+-+-+-+-+
|                       Service ID (32 bits)                    |
+-+-+-+-+-+-+-+-+-+-+-+-+-+-+-+-+-+-+-+-+-+-+-+-+-+-+-+-+-+-+-+-+
                         Service ID sub-TLV
```

FIG. 14

SOURCE ROUTING TUNNEL INGRESS PROTECTION

CROSS-REFERENCE TO RELATED APPLICATIONS

This patent application is a continuation of International Patent Application No. PCT/US2019/046387 filed Aug. 13, 2019 which claims priority to U.S. Provisional Patent Application No. 62/719,486 filed Aug. 17, 2018, both of which are hereby incorporated by reference.

TECHNICAL FIELD

This disclosure is related to the technical field of source routing, in particular source routing tunnel ingress protection.

BACKGROUND

Data is transmitted over a network in data packets. Data packets typically include a header that includes information that is used to route the data packet from a source to a destination. Segment routing (SR) is a type of source routing used for transmitting data packets. When using SR, a data source chooses a path, sometimes referred to as a tunnel, and encodes the path into a header of a data packet. The path includes a plurality of nodes and links between the nodes. The nodes include routers, switches, or other devices capable of routing packets in a network. Links may be identified as segments from one node to another node. A list of segments that the data packet will travel across during transit from a source to a destination is included in a header of each data packet. Segments are identified in the header of the data packet by a segment identifier (SID).

SUMMARY

A first aspect relates to a network node including a processor coupled to a memory. The processor is configured to receive instructions from the memory which, when executed by the processor, cause the network node to receive a path computation request from, for example, an application that is providing data traffic, a system operator, or some other entity, a path computation request; calculating, by the PCE, a first path from a first ingress node to an egress node; calculating, by the PCE, a second path from a second ingress node to a destination node; transmitting, by the PCE, a first message comprising the first path to the first ingress node; and transmitting, by the PCE, a second message comprising the second path to the second ingress node.

The method provides techniques that establish protections for an ingress node of an SR tunnel with a resource guarantee.

In a first implementation form of the method according to the second aspect, the first message comprises a plurality of segment identifiers of the first path, the destination node is the egress node, and the second message comprises another plurality of segment identifiers for the second path.

In a second implementation form of the method according to the second aspect, the method includes receiving a third message from the second ingress node, the third message indicating the second ingress node supports ingress protection.

In a third implementation form of the method according to the second aspect, the third message comprises a first flag, the first flag indicating the second ingress node is configured to detect an adjacent node failure.

In a fourth implementation form of the method according to the second aspect, the method includes transmitting a fourth message to the second ingress node, the fourth message indicating the network node supports ingress protection.

In a fifth implementation form of the method according to the second aspect, the fourth message comprises a second flag, the second flag instructing the second ingress node to set an entry for the second path in a forwarding information base (FIB) to an active state.

In a sixth implementation form of the method according to the second aspect, the first ingress node and the second ingress node are connected to a traffic source.

A third aspect relates to a non-transitory computer readable medium comprising instructions that, when executed by a processor, cause the processor to receive a path computation request from, for example, an application that is providing data traffic, a system operator, or some other entity; calculate a first path from a first ingress node to an egress node; calculate a second path from a second ingress node to a destination node; transmit a first message comprising the first path to the first ingress node; and transmit a second message comprising the second path to the second ingress node.

The non-transitory computer readable medium establishes protections for an ingress node of an SR tunnel with a resource guarantee.

In a first implementation form of the non-transitory computer readable medium according to the third aspect, the first message comprises a plurality of segment identifiers of the first path, the destination node is the egress node, and the second message comprises another plurality of segment identifiers of the second path.

In a second implementation form of the non-transitory computer readable medium according to the third aspect, the instructions further cause the processor to receive a third message from the second ingress node, the third message indicating the second ingress node supports ingress protection.

In a third implementation form of the non-transitory computer readable medium according to the third aspect, the third message comprises a first flag, the first flag indicating the second ingress node is configured to detect an adjacent node failure.

In a fourth implementation form of the non-transitory computer readable medium according to the third aspect, the instructions further cause the processor to transmit a fourth message to the second ingress node, the fourth message indicating the network node supports ingress protection.

In a fifth implementation form of the non-transitory computer readable medium according to the third aspect, the fourth message comprises a second flag, the second flag instructing the second ingress node to set an entry for the second path in a forwarding information base (FIB) to an active state.

In a sixth implementation form of the non-transitory computer readable medium according to the third aspect, the first ingress node and the second ingress node are connected to a traffic source.

A fourth aspect relates to a means for tunnel ingress protection including receiving means configured to receive a path computation request from, for example, an application that is providing data traffic, a system operator, or some other entity; processing means coupled to the receiving means, the processing means configured to calculate a first path from a first ingress node to an egress node; allocate a first list of SIDs to the first path; calculate a second path from a second ingress node to a destination node; and allocate a second list of SIDs to the second path; and transmitting means coupled to the processing means, the transmitting means configured to: transmit a first message comprising the first list of SIDs to the first ingress node; and transmit a second message comprising the second list of SIDs to the second ingress node.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

FIG. 8 is a table that illustrates a format of an Interface sub-TLV for the interface index.

FIG. 9 is a table that illustrates a format of an Interface sub-TLV for the interface IPv4 address.

FIG. 13 is a table that illustrates a format of a Service sub-TLV for a service being identified by a label.

FIG. 14 is a table that illustrates a format of a Service sub-TLV for a service being identified by a service ID of 32 bits.

DETAILED DESCRIPTION

It should be understood at the outset that, although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

In some approaches, protection for a segment routing (SR) tunnel may be limited to the links and transit nodes of the tunnel based on Internet Protocol (IP) Remote Loop-Free Alternate (LFA) Fast Reroute (FRR) technologies. Otherwise, there is currently no mechanism for protecting the ingress node (also referred to herein as an ingress) of the SR tunnel. The ingress node is a key component of the SR tunnel because the whole path/tunnel may depend on the ingress node to add the source route into the packets to be transported by the tunnel. The embodiments disclosed herein provide protections for the ingress node of the SR tunnel with a resource guarantee.

Figure 1A:
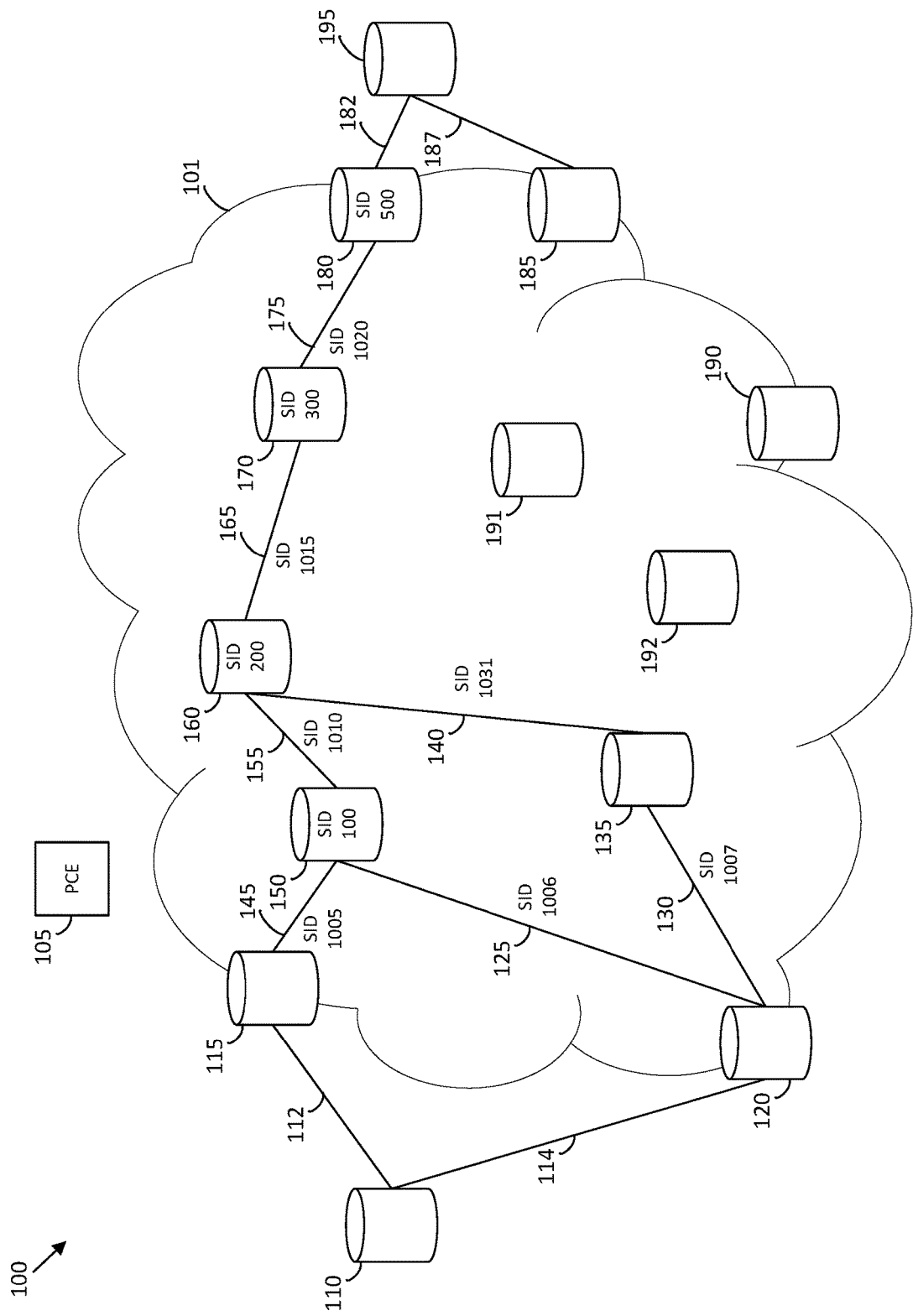
FIG. 1A is an embodiment of a network diagram illustrating nodes and segments in a tunnel with an off-tunnel backup.

FIG. 1A is an embodiment of a network diagram 100 illustrating nodes and segments in a tunnel with an off-tunnel backup. A backup ingress node for a tunnel may be off-tunnel or on-tunnel. An off-tunnel backup ingress node refers to a backup ingress node that is not on the SR tunnel (e.g., backup ingress node 120 is off-tunnel regarding an SR tunnel from edge node 115 to edge node 180). An on-tunnel backup ingress node refers to a backup ingress that is on the SR tunnel (e.g., node 160 is on the SR tunnel from edge node 115 to edge node 180). The terms SR tunnel and SR path may be interchangeable in the embodiments disclosed herein. An edge node refers to a node that is on the edge of a provider network. For example, provider network 101 includes edge node 115, edge node 120, edge node 180, edge node 185, and edge node 190. Intermediate nodes in the provider network 101 include nodes 135, 150, 160, 170, 191, and 192. A customer edge node 110 provides data to the provider network 101 for routing to a receiving customer edge node 195. Links 112, 114, 125, 130, 140, 145, 155, 165, 175, 182, and 187 connect devices for communication purposes. The links 112, 114, 125, 130, 140, 145, 155, 165, 175, 182, and 187 may be wired (e.g., physical) or wireless and may communicate using various communication protocols. In other embodiments, any number of edge nodes, intermediate nodes, and segments/links may be present in a network.

In an embodiment, a Path Computation Element (PCE) 105 or Software Defined Networking (SDN) controller (not pictured) may compute a backup path after creation of a primary path through a network. The backup path may be from the backup ingress edge node 120 to a downstream node (e.g., node 150 or node 160) of the edge node 115. The downstream node is part of a primary SR tunnel (e.g., the SR tunnel from edge node 115 to edge node 180 via node 150, node 160, and node 170). The backup path may satisfy given constrains if any constraints are given, for example Quality of Service (QoS), number of hops, shortest path, etc.

The PCE 105 or SDN controller may create a backup SR tunnel from the back ingress (e.g., edge node 120) to the downstream node (e.g., node 150, node 160, or node 170) to the egress node (edge node 180) by allocating a list of segment identifiers (SIDs) or labels for the backup SR tunnel segment along the backup path. The PCE 105 or SDN controller may also store the list for the backup SR tunnel and associate the list with the primary ingress (edge node 115) of the primary SR tunnel.

In an embodiment, nodes 150, 160, 170 and edge node 180 have node-SIDs 100, 200, 300 and 500 respectively, and links 145, 125, 130, 140, 155, 165, and 175 have adjacency-SIDs 1005, 1006, 1007, 1031, 1010, 1015, and 1020, respectively. The foregoing SIDs are merely examples of possible SIDs, any other type or length of identifier may be used. A tunnel may be defined by a listing of SIDs. Any combination of node SIDs and/or link SIDs may be used. In one example, the path from edge node 115 to node 150 to node 160 to node 170 to edge node 180 for the primary SR tunnel is an explicit path satisfying a set of constraints, but not a shortest path from edge node 115 to edge node 180. In an embodiment, the list of SIDs for the primary SR tunnel {1005, 1010, 1015, 1020} may be allocated and sent to edge node 115 by PCE 105. For packets imported into the primary SR tunnel, edge node 115 may add {1010, 1015, 1020} to the packet header and send the packet to node 150 through link 145. In an embodiment, the PCE 105 computes a backup path from edge node 120 to node 150 satisfying the constraints. The PCE 105 sends the backup path having the segment list {1006, 1010, 1015, 1020} to the edge node 120. In another embodiment, the PCE 105 computes a backup path from edge node 120 to node 150 to node 160 to node 170 to node 180 satisfying the constraints. The PCE 105 sends the backup path having the segment list {1006, 1010, 1015, 1020} to the edge node 120.

After receiving the segment list from the PCE 105, edge node 120 may create a forwarding entry, which adds {1010, 1015, 1020} into the packet header. Edge node 120 may send the packet to node 150 through link 125 when edge node 115 fails. The PCE 105 may compute an alternative backup path (edge node 120 to node 135 to node 160) from the backup ingress (edge node 120) to the downstream node 160 satisfying constraints. This backup path has a segment list {1007, 1031, 1015, 1020} and may be sent to the backup ingress (edge node 120). After receiving the segment list from the PCE 105, edge node 120 may create a forwarding entry, which adds {1031, 1015, 1020} into a header of a packet to be carried by the primary SR tunnel. Edge node 120 may then send the packet to node 135 through link 130 when edge node 115 fails.

In another embodiment, the path for the primary SR tunnel is a shortest path from the primary ingress (edge node 115) to node 160 plus a shortest path from node 160 to an egress node (edge node 180). In the case where shortest path is desired, SIDs for the nodes may be used in the path list rather than SIDs for the links. In this case, the list of SIDs for the primary SR tunnel {200, 500} is sent to edge node 115 by PCE 105. In an embodiment, after receiving the list, edge node 115 creates a forwarding entry which adds {200, 500} into a packet to be transported by the SR tunnel. Because no links are identified in the forwarding entry, the shortest path between the edge node 115 and node 160 (SID 200) and the shortest path between node 160 and edge node 180 (SID 500) may be selected.

To compute the backup SR tunnel, the PCE 105 computes a shortest path from the backup ingress node (edge node 120) to the downstream node 160 without going through the primary ingress (edge node 115). In an embodiment, the cost of each link along SR tunnel is 2 while the cost of any other link may be, 1, and there is a shortest path from edge node 120 to node 160 without edge node 115 (e.g., edge node 120 to node 135 to node 160 is a shortest path). This shortest path may have the same segment list {200, 500}, and the PCE 105 may send the list to the backup ingress node (edge node 120). After receiving the list from PCE 105, edge node 120 may create a forwarding entry, which adds {200, 500} into the packet to be transported by the SR tunnel when edge node 115 fails. Edge node 120 may then send the packet along the shortest path to node 160 via node 135 when edge node 115 fails.

In some embodiments, the PCE 105 may send any combination of the following to the backup ingress node (e.g., edge node 120): 1) information needed for creating a backup SR tunnel, the backup SR tunnel including a backup SR tunnel segment from the backup ingress to a downstream node, and an existing SR tunnel segment from the downstream node to the primary egress node; 2) a traffic description, which describes the traffic that the primary SR tunnel carries; and 3) a service SID/Label if any, which indicates the service, such as a Virtual Private Network (VPN) service, that the primary SR tunnel transports. In one embodiment, the information needed for creating a backup SR tunnel is the backup path from the backup ingress node to the primary egress node and the segment list for the backup path.

In some embodiments, the backup ingress node (e.g., edge node 120) creates a forwarding entry in a forwarding information base (FIB) after receiving the above information. The forwarding entry may be used to: 1) import packets/traffic into the backup SR tunnel according to the traffic description for the primary SR tunnel; 2) push the service SID/Label (if any) into each of the packets to be imported into the backup SR tunnel; 3) push the list of SIDs/Labels for the backup SR tunnel into each of the packets to be imported into the backup SR tunnel; and/or 4) send the packet to the direct downstream node of the backup ingress node along the backup SR tunnel.

The backup ingress node (e.g., edge node 120) may send the PCE 105 or SDN controller a report to indicate that the protection is available for the primary ingress node (e.g., edge node 115) after the forwarding entry is created successfully. The PCE 105 may record the status of the primary ingress node (e.g., edge node 115) of the primary SR tunnel regarding ingress protection according to the report received from the backup ingress node (e.g., edge node 120).

In a further example, a primary SR tunnel exists between a primary ingress node and a primary egress node through one or more downstream transit nodes. A backup ingress node may be computed or configured to protect the failure of the primary ingress node. A source node (the source of the traffic, e.g., customer edge node 110)) may be connected to the primary ingress node (e.g., edge node 115) and the backup ingress node (e.g. edge node 120).

In an embodiment, the source node (e.g., customer edge node 110) sends the traffic to the primary ingress node for the primary SR tunnel in normal operations. The primary ingress node imports the traffic into the tunnel transporting the traffic to its destination. If the primary ingress node fails, the source node switches the traffic to the backup ingress node (e.g., edge node 120) after detecting the failure. A forwarding entry in the FIB on the backup ingress node imports the traffic into the backup SR tunnel (consisting of the backup SR tunnel segment (e.g., link 125) from the backup ingress node to a downstream node (e.g., node 150) and the existing primary SR tunnel segment from the downstream node to the primary egress node) transporting the traffic to its destination.

In another embodiment, the source node sends the traffic to the primary ingress node for the primary SR tunnel. The primary ingress node imports the traffic into the tunnel transporting the traffic to the destination. The source node also sends the traffic to the backup ingress node, which drops the traffic in normal operations through setting the corresponding forwarding entry in the FIB to be inactive. If the primary ingress node fails, the backup ingress node sets the corresponding forwarding entry in the FIB to be active and begins to import the traffic into the backup SR tunnel. The active forwarding entry in the FIB on the backup ingress node imports the traffic into the backup SR tunnel (consisting of the backup SR tunnel segment from the backup ingress node to a downstream node and the existing primary SR tunnel segment from the downstream node to the primary egress node).

Figure 1B:
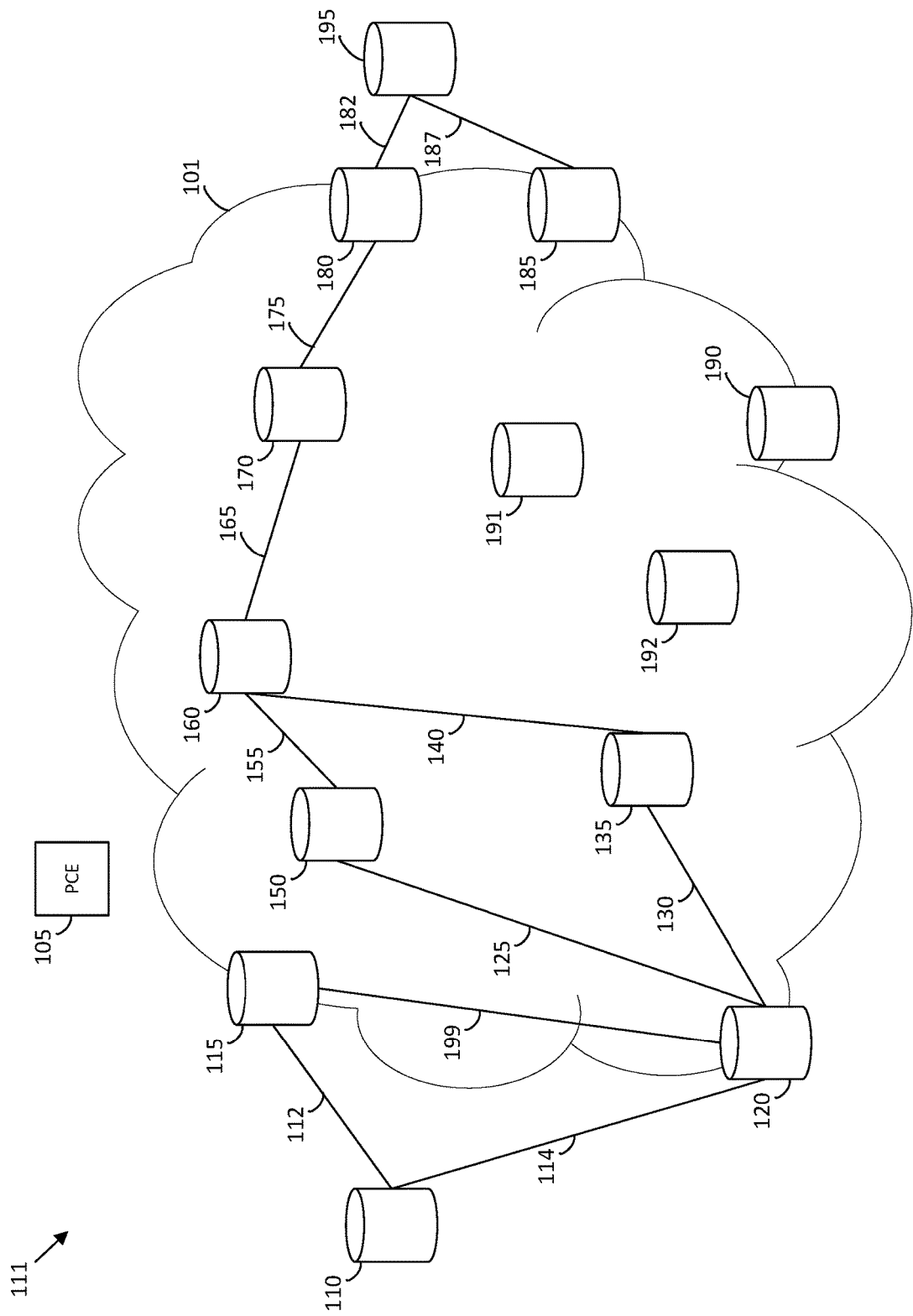
FIG. 1B is an embodiment of a network diagram illustrating nodes and segments in a tunnel with an on-tunnel backup.

FIG. 1B is an embodiment of a network diagram 111 illustrating nodes and segments in a tunnel with an on-tunnel backup. In a mechanism for protecting the ingress of a tunnel using an on-tunnel backup ingress, the PCE 105 obtains a path segment along the primary SR tunnel. The primary SR tunnel may be from edge node 115 to the edge node 180. The primary SR tunnel may include link 199 to link 125 to link 155 to link 165 to link 175. The PCE 105 creates a backup SR tunnel along the backup path to protect from primary ingress node failure. The backup SR tunnel may include link 125 to link 155 to link 165 to link 175. In this case, the backup ingress node (edge node 120) is on the primary tunnel.

The PCE 105 may obtain the list of SIDs or labels allocated for the SR tunnel segment along the path segment, and then associate the list with the primary ingress node of the primary SR tunnel that is to be protected. The PCE 105 sends the information needed for creating a backup SR tunnel to the backup ingress node. The PCE 105 may also send a traffic description, which describes the traffic that the primary SR tunnel carries, to the backup ingress node. The PCE 105 may also send a service SID/Label if any, which indicates the service that the primary SR tunnel transports, such as a VPN service, to the backup ingress node.

The backup ingress node creates a forwarding entry in its FIB after receiving the above information. The forwarding entry may import packets/traffic according to the traffic description for the primary SR tunnel into the backup SR tunnel, push the service SID/Label (if any) into each of the packets to be imported into the backup SR tunnel, and/or push the list of SIDs/Labels for the backup SR tunnel into each of the packets to be imported into the backup SR tunnel when the primary ingress node fails.

In an embodiment, the backup ingress node sends the PCE 105 or the SDN controller a report to indicate that the protection is available for the primary ingress node after the forwarding entry is created successfully. The report may be a message or other indicator that indicates the backup ingress node is configured to act as a back up. In an embodiment, the PCE 105 records the status of the primary ingress node of the primary SR tunnel regarding the protection according to the report received from the backup ingress node.

For example, a primary SR tunnel from a primary ingress node to a primary egress node through some downstream transit nodes is calculated. A backup ingress node is computed or configured, which is used to protect the failure of the primary ingress node. A source node (the source of the traffic, e.g., consumer edge node 110) is connected to the primary ingress node and the backup ingress node. The source node sends the traffic to the primary ingress node for the primary SR tunnel, and the primary ingress node imports the traffic into the tunnel transporting the traffic to its destination. If the primary ingress node fails, the source node may switch the traffic to the backup ingress node from the primary ingress node. The forwarding entry in the FIB on the backup ingress node created above may import the traffic into the backup SR tunnel (which is from the backup ingress to the primary egress) transporting the traffic to the destination.

In an embodiment, a Path Computation Client (PCC) may run on a node in the network such that when a PCE and a PCC establish a PCE Protocol (PCEP) session, the PCE and PCC exchange capabilities of supporting protection of the ingress node of a SR tunnel/path (also referred to as SR_INGRESS_PROTECTION_CAPABILITY).

Figure 2:
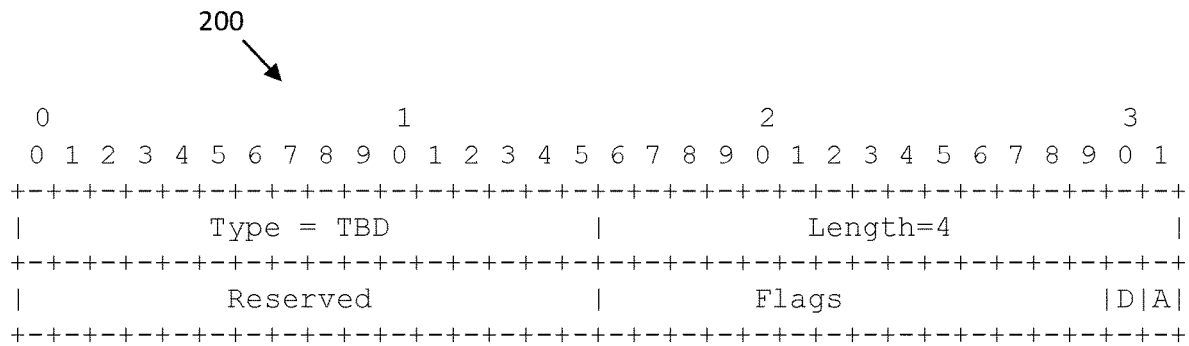
FIG. 2 is a table that illustrates a format of a sub-type-length-value (TLV) of the SR_INGRESS_PROTECTION-_CAPABILITY information element.

FIG. 2 is a table 200 that illustrates a format of a sub-type-length-value (TLV) of the SR_INGRESS_PROTECTION_CAPABILITY information element according to various embodiments. The SR_INGRESS_PROTECTION_CAPABILITY sub-TLV is included in the PATH_SETUP_TYPE_CAPABILITY TLV with a Path Setup Type (PST)=2 (backup SR tunnel/path) in the OPEN object, which is exchanged in OPEN messages when a PCC and a PCE establish a PCEP session. In an embodiment, the "Flags" field may be 2 octets long with two flags defined as follows: a D flag that is set to 1 by the PCC to indicate that the node running the PCC is able to detect a failure of its adjacent node (e.g., the primary ingress node), and an A flag that is set to 1 by the PCE to request PCC to let the forwarding entry for the backup SR tunnel/path be Active. The "Reserved" field may be 2 octets long and may be set to zero on transmission and ignored on reception.

In an embodiment, a PCC, which supports ingress protection for a SR tunnel/path, may send an OPEN message containing an SR_INGRESS_PROTECTION_CAPABILITY sub-TLV, which indicates that the PCC is capable of supporting the ingress protection for a SR tunnel/path, to a PCE. A PCE supporting ingress protection for a SR tunnel/path may send an OPEN message containing an SR_INGRESS_PROTECTION_CAPABILITY sub-TLV, to a PCC. This sub-TLV may indicate that the PCE is capable of supporting the ingress protection for a SR tunnel/path.

For example, assume that both PCC and PCE support SR_PCE_CAPABILITY, that is that each of the OPEN messages sent by PCC and PCE contains PATH-SETUP-TYPE-CAPABILITY TLV with a PST list containing PST=1 and a SR-PCE-CAPABILITY sub-TLV. In an embodiment, if a PCE receives an OPEN message without a SR_INGRESS_PROTECTION_CAPABILITY sub-TLV from a PCC, then the PCE may not send the PCC a request for ingress protection of a SR tunnel/path. If a PCC receives an OPEN message without a SR_INGRESS_PROTECTION_CAPABILITY sub-TLV from a PCE, then the PCC may ignore a request for ingress protection of a SR tunnel/path from the PCE. If a PCC sets the D flag to zero, then the PCE may send the PCC an OPEN message with the A flag set to one. In an embodiment, when the PCE sends the PCC a message for initiating a SR tunnel/path, the PCE may set the A flag to one.

In an embodiment, a PCE sends a PCC a PCInitiate message for initiating a backup SR tunnel/path to protect the primary ingress node of a primary SR tunnel/path, the PCInitiate message includes information relevant to the backup SR tunnel/path (also referred to herein as SR_INGRESS_PROTECTION).

Figure 3:
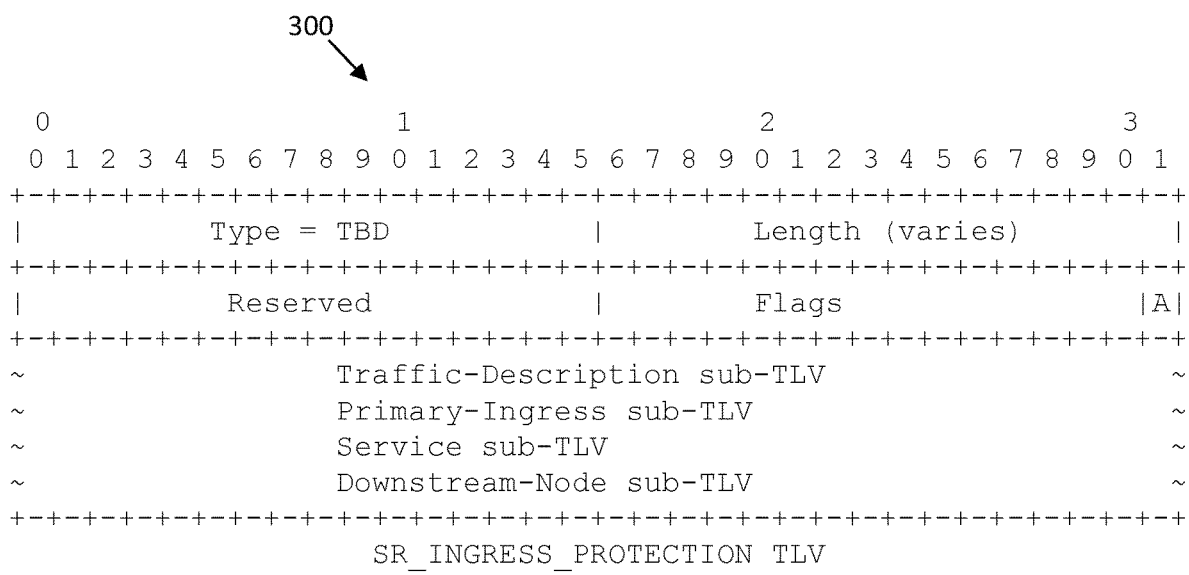
FIG. 3 is a table that illustrates a format of a TLV of the SR_INGRESS_PROTECTION information element.

FIG. 3 is a table 300 that illustrates a format of a TLV of the SR_INGRESS_PROTECTION information element according to various embodiments. When a PCE sends a PCC a PCInitiate message for initiating a backup SR tunnel/path to protect the primary ingress node of a primary SR tunnel/path, the message contains this TLV in the RP/SRP object. In an embodiment, the "Flags" field is 2 octets long with one flag defined as follows: an A flag that is set to 1 by the PCE to request the PCC to let the forwarding entry for the backup SR tunnel/path be Active. The "Reserved" field may be two octets long and may be set to zero on transmission and ignored on reception.

In an embodiment, this TLV may also include a Traffic-Description sub-TLV that describes the traffic to be imported into the backup SR tunnel, a Primary-Ingress sub-TLV that indicates the IP address of the primary ingress node, a Service sub-TLV that contains a service label or identifier (ID) to be added into a packet to be carried by SR tunnel, and/or a Downstream-Node sub-TLV that gives the IP address of the downstream node.

Figure 4:
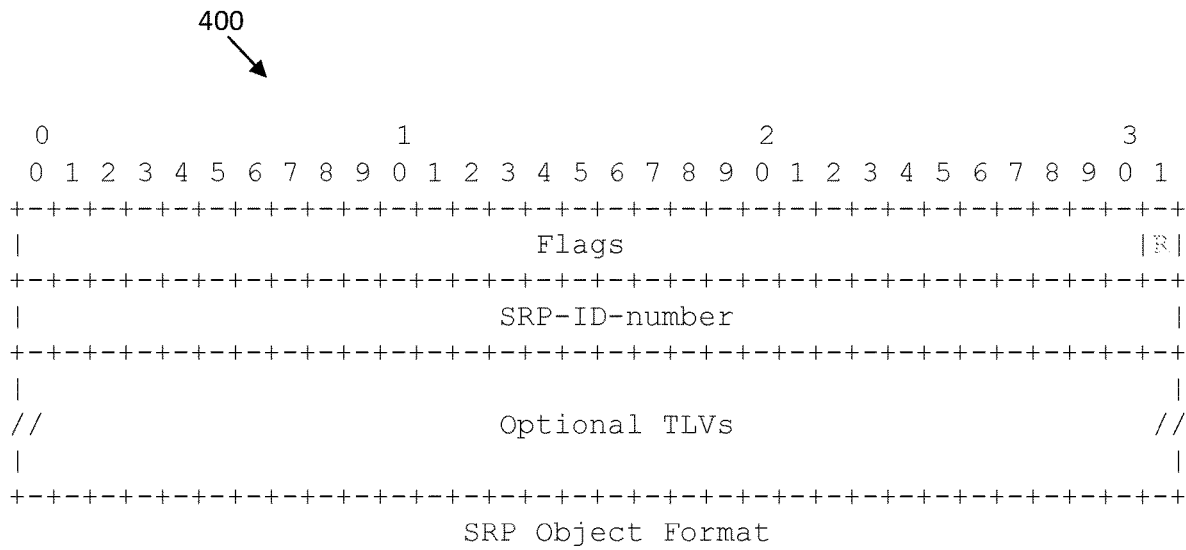
FIG. 4 is a table that illustrates a format of a Stateful Request Parameter (SRP) object.

FIG. 4 is a table 400 that illustrates a format of a Stateful Request Parameter (SRP) object, which is partially defined in Internet Engineering Task Force (IETF) Request for Comments (RFC) 8231, entitled "Path Computation Element Protocol (PCEP) Extensions for Stateful PCE," dated September 2017. In an embodiment, a one bit R flag (Label Switched Path (LSP)—Remove) is included, in which 0 indicates a request to create an LSP or SR tunnel, and 1 indicates a request to remove an LSP or SR tunnel.

Figure 5:
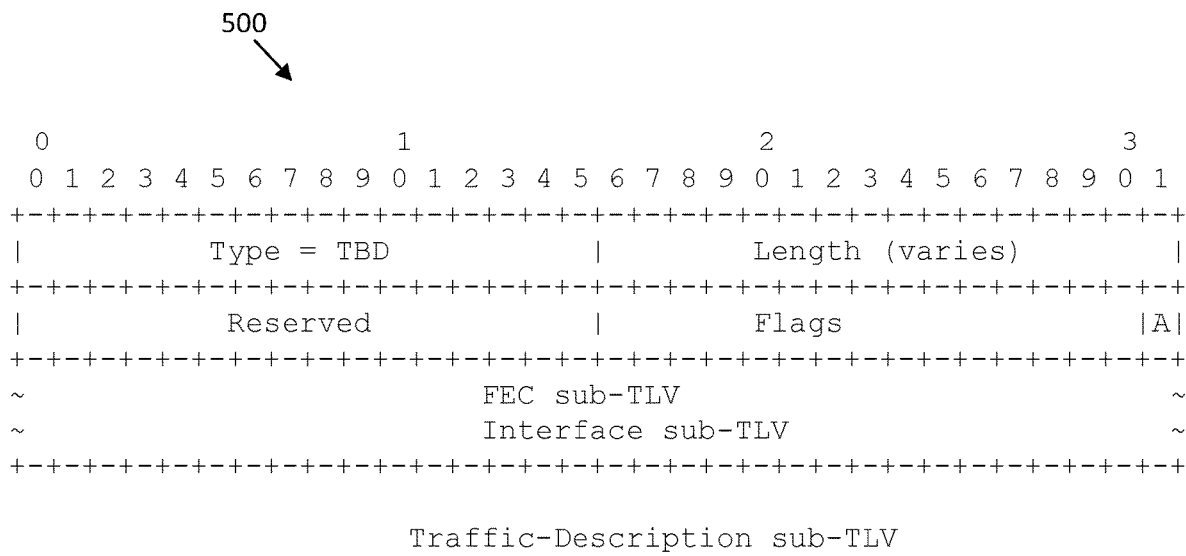
FIG. 5 is a table that illustrates the Traffic-Description sub-TLV.

FIG. 5 is a table 500 that illustrates the Traffic-Description sub-TLV according to various embodiments. In an embodiment, the "Flags" field is 2 octets long with one flag defined as follows: an A flag that is set to 1 by the PCE to request the PCC to let the forwarding entry for the backup SR tunnel/path be Active. In an embodiment, the "Reserved" field may be 2 octets and may be set to zero on transmission and ignored on reception.

In an embodiment, the SR_INGRESS_PROTECTION_TLV may also include a Forward Equivalent Class (FEC) sub-TLV which describes the traffic to be imported into the backup SR tunnel and is an IP prefix with an optional virtual network ID, shown below in FIGS. 6-7.

Figure 6:
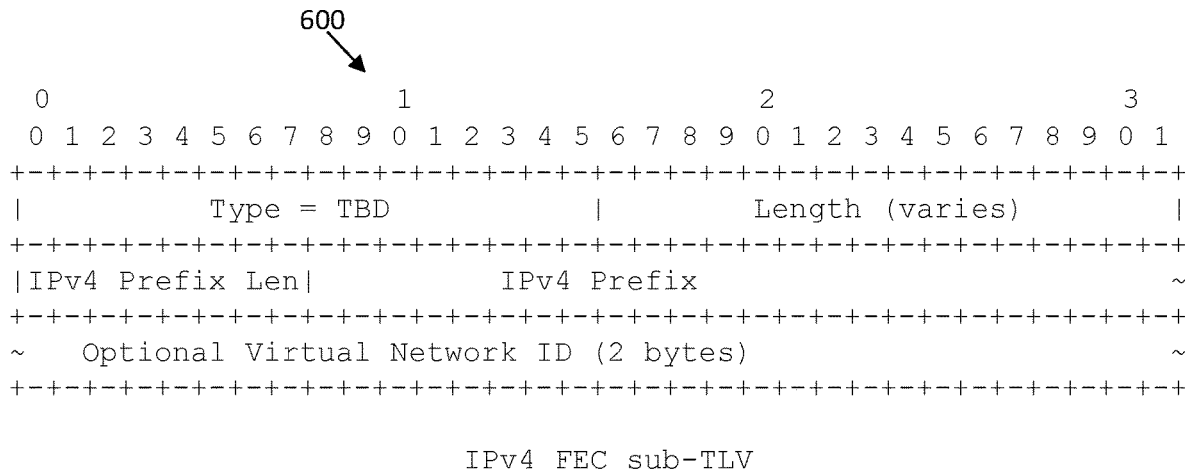
FIG. 6 is a table that illustrates a format of a FEC sub-TLV for IP version 4 (IPv4).

FIG. 6 is a table 600 that illustrates a format of a FEC sub-TLV for IP version 4 (IPv4) according to various embodiments.

Figure 7:
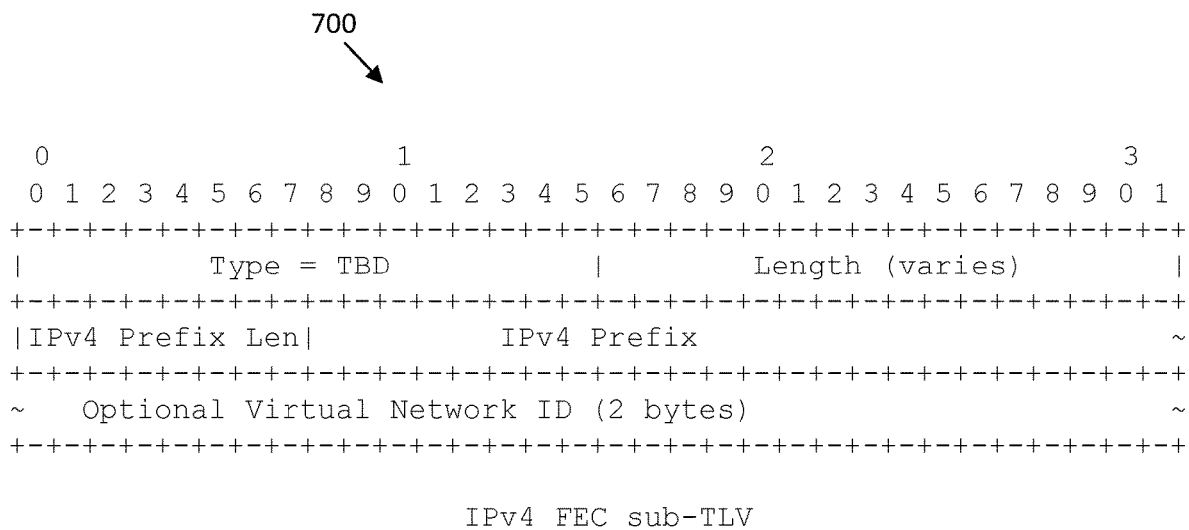
FIG. 7 is a table that illustrates a format of a FEC sub-TLV for IP version 6 (IPv6).

FIG. 7 is a table 700 that illustrates a format of a FEC sub-TLV for IP version 6 (IPv6) according to various embodiments.

In an embodiment, the SR_INGRESS_PROTECTION TLV may also include an Interface sub-TLV that indicates the interface from which the traffic is received and imported into the backup SR tunnel.

FIG. 8 is a table 800 that illustrates a format of an Interface sub-TLV for the interface index according to various embodiments.

FIG. 9 is a table 900 that illustrates a format of an Interface sub-TLV for the interface IPv4 address according to various embodiments.

Figure 10:
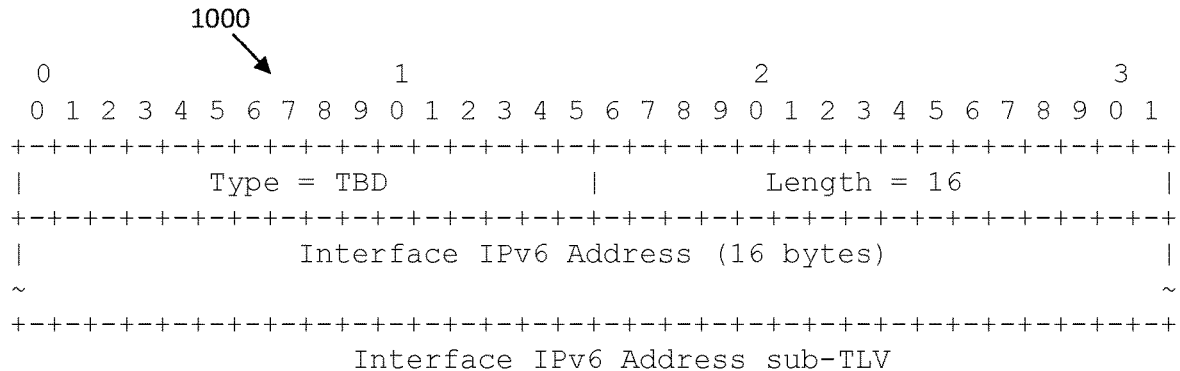
FIG. 10 is a table that illustrates a format of an Interface sub-TLV for the interface IPv6 address.

FIG. 10 is a table 1000 that illustrates a format of an Interface sub-TLV for the interface IPv6 address according to various embodiments.

Figure 11:
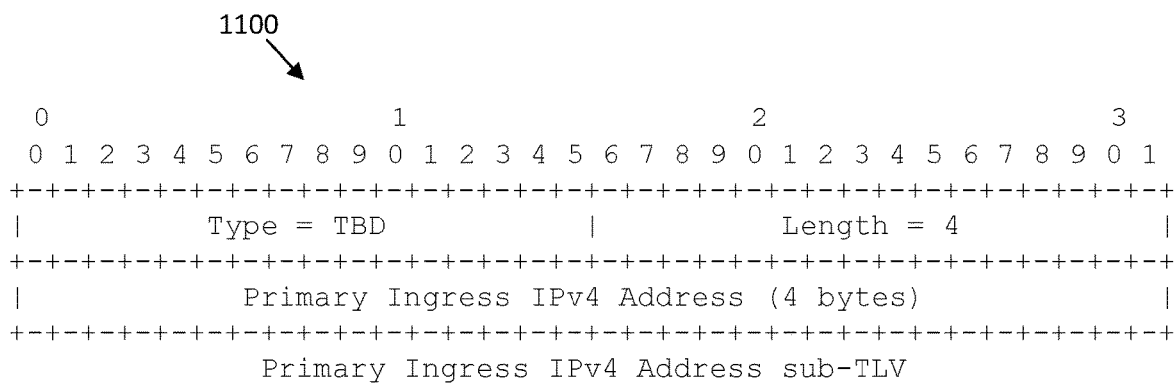
FIG. 11 is a table that illustrates a format of a Primary-Ingress sub-TLV for a primary ingress node having an IPv4 address.
Figure 12:
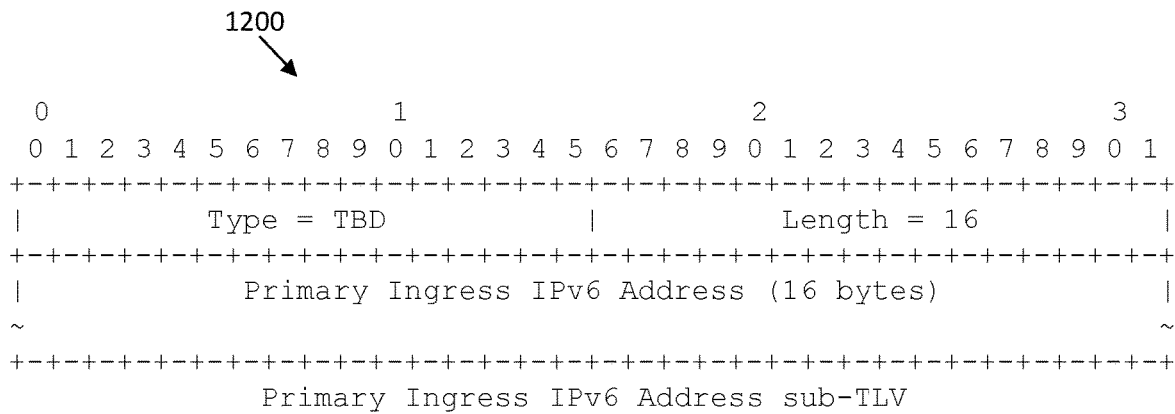
FIG. 12 is a table that illustrates a format of a Primary-Ingress sub-TLV for a primary ingress node having an IPv6 address.

In an embodiment, the Primary-Ingress sub-TLV may have two formats, which are illustrated in FIGS. 11-12.

FIG. 11 is a table 1100 that illustrates a format of a Primary-Ingress sub-TLV for a primary ingress node having an IPv4 address according to various embodiments.

FIG. 12 is a table 1200 that illustrates a format of a Primary-Ingress sub-TLV for a primary ingress node having an IPv6 address according to various embodiments.

In an embodiment, the Service sub-TLV also has two formats:

FIG. 13 is a table 1300 that illustrates a format of a Service sub-TLV for a service being identified by a label according to various embodiments. In an embodiment, a label is the least significant 20 bits of a 32 bit word.

FIG. 14 is a table 1400 that illustrates a format of a Service sub-TLV for a service being identified by a service ID of 32 bits according to various embodiments.

Figure 15:
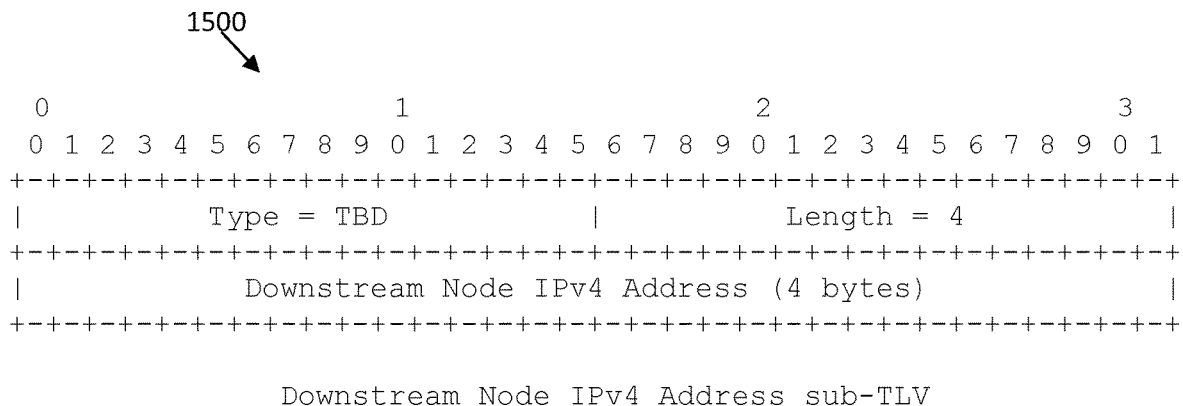
FIG. 15 is a table that illustrates a format of a Downstream-Node sub-TLV for a downstream node having an IPv4 address.

In an embodiment, the Downstream-Node sub-TLV may also have two formats:

FIG. 15 is a table 1500 that illustrates a format of a Downstream-Node sub-TLV for a downstream node having an IPv4 address according to various embodiments.

Figure 16:
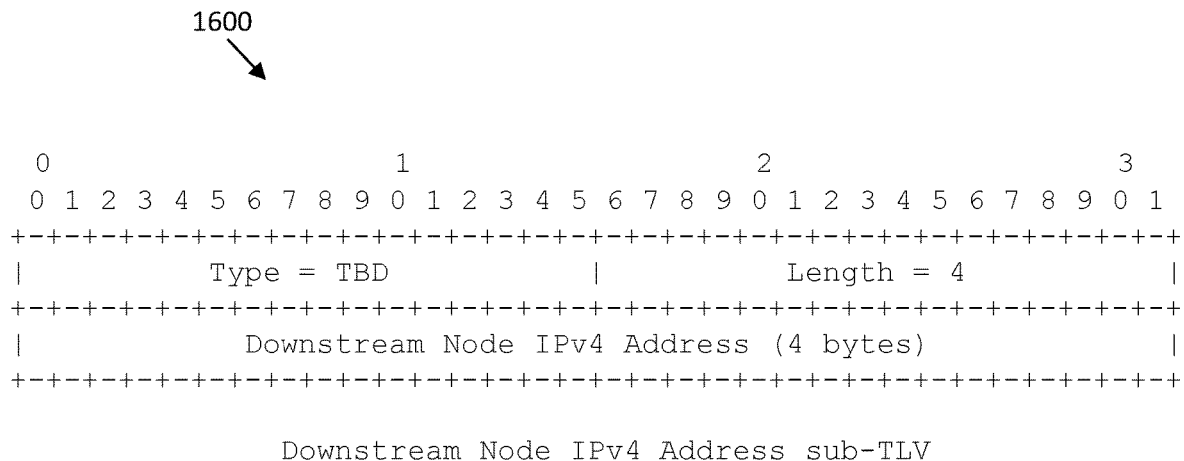
FIG. 16 is a table that illustrates a format of a Downstream-Node sub-TLV for a downstream node having an IPv6 address.

FIG. 16 is a table 1600 that illustrates a format of a Downstream-Node sub-TLV for a downstream node having an IPv6 address according to various embodiments.

Figure 17:
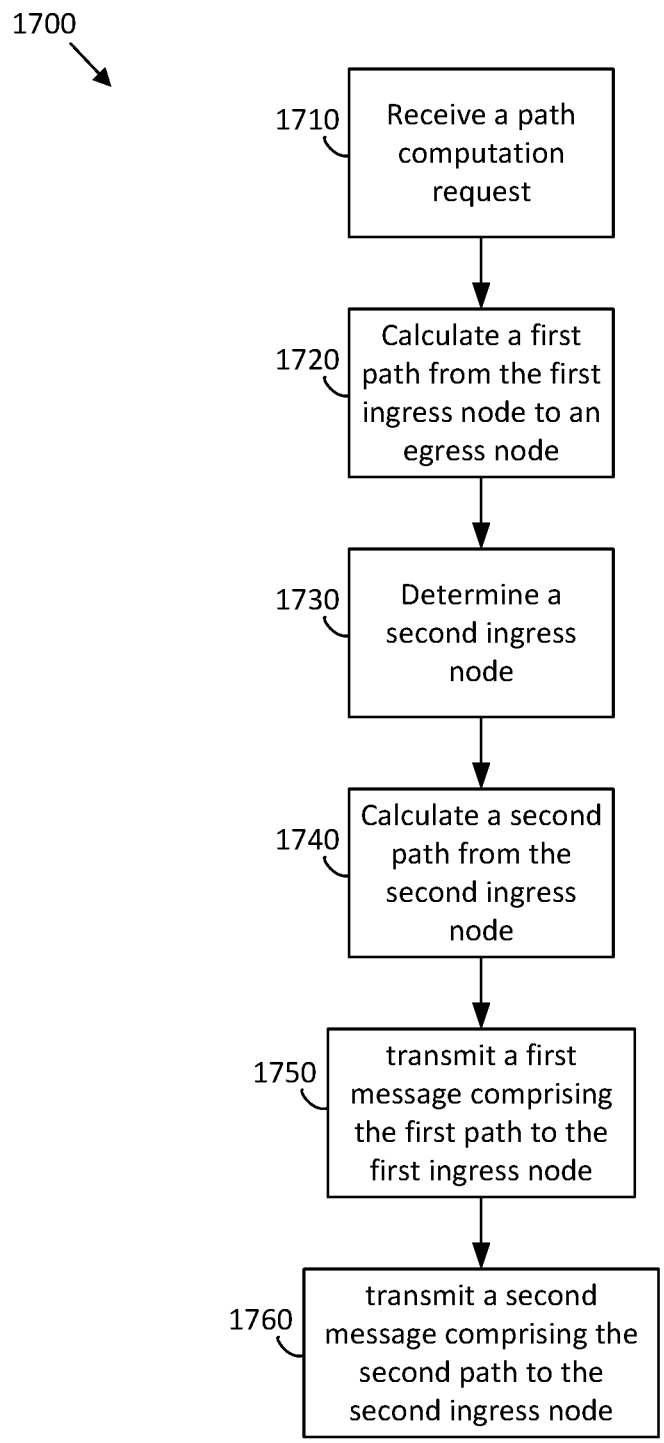
FIG. 17 is a flow diagram of an embodiment of a method for source routing tunnel ingress protection.

FIG. 17 is a flow diagram of an embodiment of a method 1700 for source routing tunnel ingress protection. The method 1700 begins at block 1710 when a PCE or SDN may receive a path computation request. The path computation request to the PCE or SDN may be received from an application that is providing data traffic, a system operator, or some other entity.

The method continues at block 1720 when the PCE or SDN calculates a first path from a first ingress node to an egress node. The first path may traverse a network where the first ingress node and egress node are edge nodes of the network. In addition to the first ingress node and egress node, the first path may include any number of additional nodes which may be referred to as downstream nodes, e.g., downstream of the first ingress node. The first ingress node may receive data traffic for transmission via the first path from a customer edge node or some other source of data traffic.

At block 1730, the PCE or SDN may determine a second ingress node. The second ingress node is configured to receive data traffic from the same source as the first ingress node. In this configuration, both the first ingress node and the second ingress node may receive data traffic from the same source for transmission to the egress node. In some cases, the source may transmit the data traffic to both the first ingress node and the second ingress node substantially simultaneously or may transmit to only the first ingress node and then only the second ingress node if the first ingress node fails.

At block 1740, the PCE or SDN may calculate a second path from the second ingress node to the egress node. The second ingress node is an edge node of the network. The second path may include at least a portion of the first path. For example, the second path may be from the second ingress node to one of the downstream nodes of the first path. From the downstream node, the second path would follow the first path.

At block 1750, the PCE or SDN may transmit a first message including the first path to the first ingress node. The first path in the first message may be identified by a listing of links that data traffic should traverse in order to reach the egress node. In another case, the first path may be identified by a listing of nodes that the data traffic should traverse in order to reach the egress node. The listings may be segment lists where nodes and segments are identified by SIDs.

At block 1760, the PCE or SDN may transmit a second message including the second path to the second ingress node. The second path in the second message may be identified by a listing of links that data traffic should traverse in order to reach the egress node. In another case, the second path may be identified by a listing of nodes that the data traffic should traverse in order to reach the egress node. The listings may be segment lists where nodes and segments are identified by SIDs.

Figure 18:
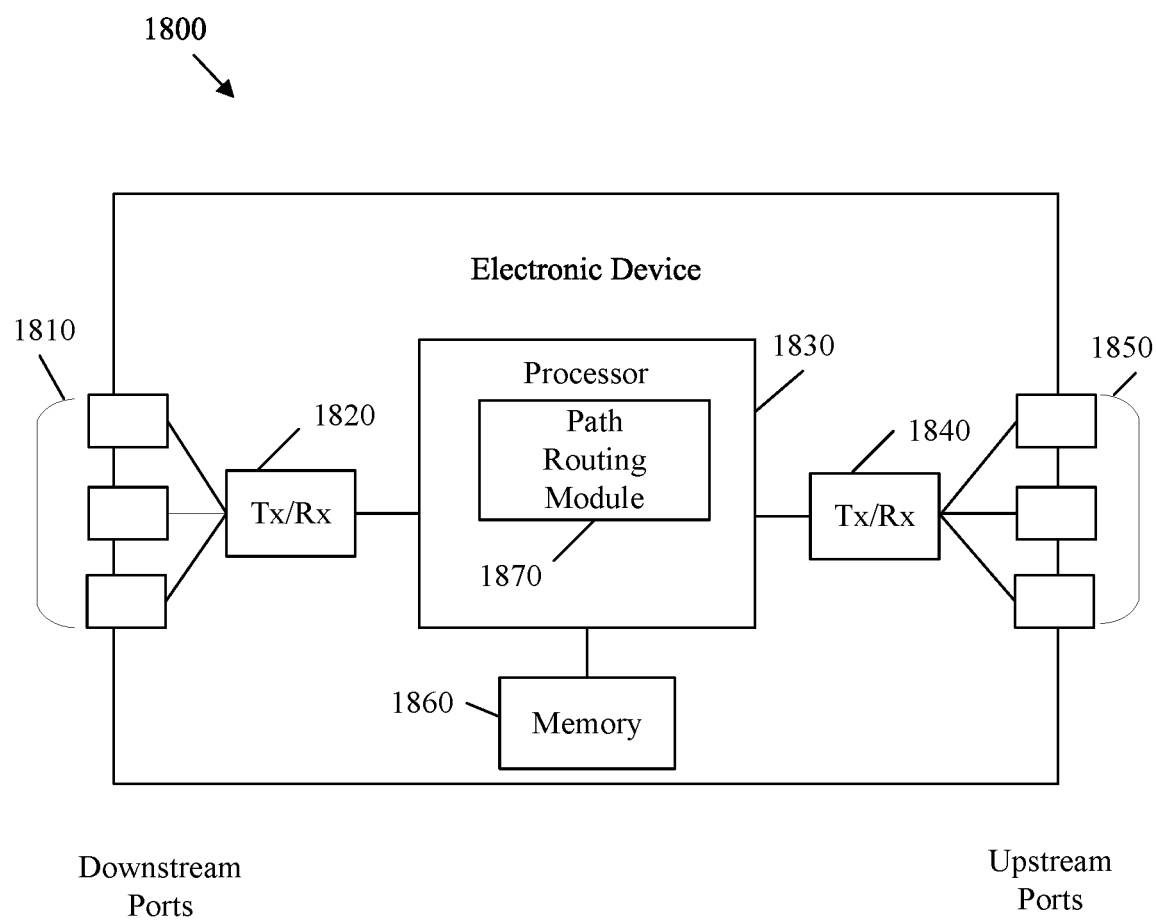
FIG. 18 is a schematic diagram of an electronic device according to an embodiment of the disclosure.

FIG. 18 is a schematic diagram of an electronic device 1800 according to an embodiment of the disclosure. The electronic device 1800 is suitable for implementing the disclosed embodiments as described herein. The electronic device 1800 comprises ingress ports 1810 and receiver units (Rx) 1820 for receiving data; a processor, logic unit, or central processing unit (CPU) 1830 to process the data; transmitter units (Tx) 1840 and egress ports 1850 for transmitting the data; and a memory 1860 for storing the data. The electronic device 1800 may also comprise optical-to-electrical (OE) components and electrical-to-optical (EO) components coupled to the ingress ports 1810, the receiver units 1820, the transmitter units 1840, and the egress ports 1850 for egress or ingress of optical or electrical signals.

The processor 1830 is implemented by hardware and software. The processor 1830 may be implemented as one or more CPU chips, cores (e.g., as a multi-core processor), field-programmable gate arrays (FPGAs), application specific integrated circuits (ASICs), and digital signal processors (DSPs). The processor 1830 is in communication with the ingress ports 1810, receiver units 1820, transmitter units 1840, egress ports 1850, and memory 1860. The processor 1830 comprises a path routing module 1870. The path routing module 1870 implements the disclosed embodiments described above. For instance, the path routing module 1870 implements, processes, parses, prepares, or provides the various path routing. The inclusion of the path routing module 1870 therefore provides a substantial improvement to the functionality of the device 1800 and effects a transformation of the device 1800 to a different state. Alternatively, the path routing module 1870 is implemented as instructions stored in the memory 1860 and executed by the processor 1830.

The memory 1860 comprises one or more disks, tape drives, and solid-state drives and may be used as an overflow data storage device, to store programs when such programs are selected for execution, and to store instructions and data that are read during program execution. The memory 1860 may be volatile and/or non-volatile and may be read-only memory (ROM), random-access memory (RAM), ternary content-addressable memory (TCAM), and/or static random-access memory (SRAM).

Figure 19:
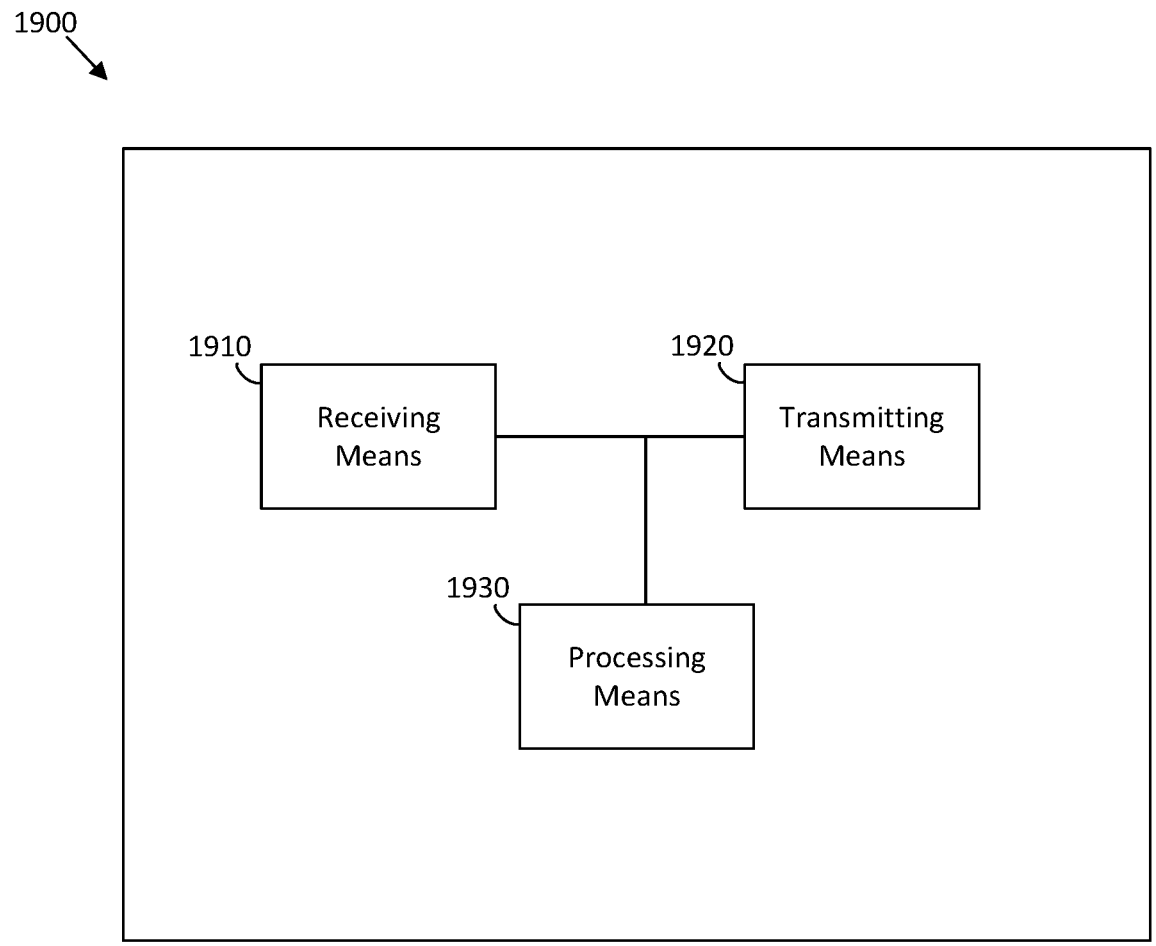
FIG. 19 is a diagram of a means for tunnel ingress protection.

FIG. 19 is a diagram of a means for tunnel ingress protection 1900, for example a network node comprising a PCE or SDN. The means for tunnel ingress protection 1900 includes receiving means 1910, for example receiver units 1820; transmitting means 1920, for example transmitter units 1840; and processing means 1930, for example processor 1830. The receiving means 1910 may be configured to receive a path computation request. The processing means 1930 may be coupled to the receiving means 1910. The processing means 1930 may be configured to calculate a first path from the first ingress node to an egress node; allocate a first list of SIDs to the first path; determine a second ingress node; calculate a second path from the second ingress node to a destination node; and allocate a second list of SIDs to the second path. The transmitting means 1920 may be coupled to the processing means 1930. The transmitting means 1920 may be configured to transmit a first message comprising the first path and the first list of SIDs to the first ingress node; and transmit a second message comprising the second path and the second list of SIDs to the second ingress node.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A network node, comprising:

a memory; and a processor coupled to the memory, the processor configured to receive instructions from the memory which, when executed by the processor, cause the network node to:

receive a path computation request;

calculate a first path from a first ingress node to an egress node, wherein the first ingress node comprises an edge node;

calculate a second path from a second ingress node to a destination node, wherein the second ingress node comprises an edge node;

transmit a first message comprising the first path to the first ingress node; and transmit, for ingress protection, a second message comprising the second path to only the second ingress node.

2. The network node of claim 1, wherein the first message comprises a plurality of segment identifiers of the first path, and wherein the destination node is the egress node and the second message comprises another plurality of segment identifiers of the second path.

3. The network node of claim 1, wherein the processor is further configured to receive a third message from the second ingress node, the third message indicating the second ingress node supports ingress protection.

4. The network node of claim 3, wherein the third message comprises a first flag, the first flag indicating the second ingress node is configured to detect an adjacent node failure.

5. The network node of claim 3, wherein the processor is further configured to transmit a fourth message to the second ingress node, the fourth message indicating the network node supports ingress protection.

6. The network node of claim 5, wherein the fourth message comprises a second flag, the second flag instructing the second ingress node to set an entry for the second path in a forwarding information base (FIB) to an active state.

7. The network node of claim 1, wherein the first ingress node and the second ingress node are connected to a traffic source.

8. A method for source routing ingress protection by a path computation element (PCE), the method comprising:
receiving a path computation request;
calculating a first path from a first ingress node to an egress node, wherein the first ingress node comprises an edge node;
calculating a second path from a second ingress node to a destination node, wherein the second ingress node comprises an edge node;
transmitting a first message comprising the first path to the first ingress node; and
transmitting a second message, for ingress protection, comprising the second path to only the second ingress node.

9. The method of claim 8, wherein the first message comprises a plurality of segment identifiers of the first path, wherein the destination node is the egress node, and the second message comprises another plurality of segment identifiers for the second path.

10. The method of claim 8, further comprising receiving a third message from the second ingress node, the third message indicating the second ingress node supports ingress protection.

11. The method of claim 10, wherein the third message comprises a first flag, the first flag indicating the second ingress node is configured to detect an adjacent node failure.

12. The method of claim 10, further comprising transmitting a fourth message to the second ingress node, the fourth message indicating the network node supports ingress protection.

13. The method of claim 12, wherein the fourth message comprises a second flag, the second flag instructing the second ingress node to set an entry for the second path in a forwarding information base (FIB) to an active state.

14. The method of claim 8, wherein the first ingress node and the second ingress node are connected to a traffic source.

15. A non-transitory computer readable medium comprising instructions that, when executed by a processor, cause the processor to:
receive a path computation request;
calculate a first path from a first ingress node to an egress node, wherein the first ingress node comprises an edge node;
calculate a second path from a second ingress node to a destination node, wherein the second ingress node comprises an edge node;
transmit a first message comprising the first path to the first ingress node; and
transmit a second message, for ingress protection, comprising the second path to only the second ingress node.

16. The non-transitory computer readable medium of claim 15, wherein the first message comprises a plurality of segment identifiers of the first path, the destination node is the egress node, and the second message comprises another plurality of segment identifiers of the second path.

17. The non-transitory computer readable medium of claim 15, wherein the instructions further cause the processor to receive a third message from the second ingress node, the third message indicating the second ingress node supports ingress protection.

18. The non-transitory computer readable medium of claim 17, wherein the third message comprises a first flag, the first flag indicating the second ingress node is configured to detect an adjacent node failure.

19. The non-transitory computer readable medium of claim 17, wherein the instructions further cause the processor to transmit a fourth message to the second ingress node, the fourth message indicating the network node supports ingress protection.

20. The non-transitory computer readable medium of claim 19, wherein the fourth message comprises a second flag, the second flag instructing the second ingress node to set an entry for the second path in a forwarding information base (FIB) to an active state.

* * * * *